US005845785A

United States Patent [19]

Oppliger et al.

[11] Patent Number: 5,845,785

[45] Date of Patent: Dec. 8, 1998

[54] APPARATUS AND METHOD FOR PROCESSING SHIPPING ARTICLES PROVIDED WITH SHIPPING ADDRESSES

[75] Inventors: Jean Claude Oppliger, Niederhasli, Switzerland; Thomas Zimmermann, Wutoeschingen, Germany; Beat Fritsche, Greifensee, Switzerland

[73] Assignee: Grapha-Holding AG, Hergiswil, Switzerland

[21] Appl. No.: 606,045

[22] Filed: Feb. 21, 1996

[30] Foreign Application Priority Data

Feb. 21, 1995 [CH] Switzerland .................... 00 499/95-4

[51] Int. Cl.[6] ................................................ B65G 1/10

[52] U.S. Cl. ......................... 209/584; 209/900; 209/546; 209/909; 414/331; 414/800; 414/806; 414/593; 198/347.1

[58] Field of Search .................................. 209/900, 584, 209/909, 546, 630, 583; 414/331, 593, 806, 800; 198/347.1, 349.5

[56] References Cited

U.S. PATENT DOCUMENTS

| | | | |
|---|---|---|---|
| 3,519,145 | 7/1970 | Macdonald . | |
| 4,632,252 | 12/1986 | Haruki et al. | 209/900 X |
| 5,324,025 | 6/1994 | Chadwick et al. . | |

FOREIGN PATENT DOCUMENTS

| | | | |
|---|---|---|---|
| 215469 | 3/1987 | European Pat. Off. | 209/584 |
| 0 575 032 | 12/1993 | European Pat. Off. . | |
| 1445452 | 6/1966 | France | 209/900 |
| 258895 | 8/1988 | Germany | 209/900 |
| 614388 | 12/1960 | Italy | 209/900 |
| 48308 | 3/1984 | Japan | 414/331 |
| 8403680 | 7/1986 | Netherlands | 209/584 |

*Primary Examiner*—Frank E. Werner
*Attorney, Agent, or Firm*—Spencer & Frank

[57] ABSTRACT

The invention relates to an apparatus for processing shipping articles provided with shipping addresses. The apparatus comprises a device for transporting the shipping articles along a transport path. A device is disposed in the transport path for automatically reading the shipping addresses. An assessment device automatically assesses the read shipping addresses. The individual shipping articles are selectively deposited into cells of an intermediate storage device disposed in the transport path following the reading of the shipping address. A detection device detects an association between each cell and the shipping article deposited therein and in response to an assessment of the shipping address by the assessment device, produces a first removal signal for removing the shipping article from the cell and conveying the shipping article back to the transport path.

23 Claims, 2 Drawing Sheets

APPARATUS AND METHOD FOR PROCESSING SHIPPING ARTICLES PROVIDED WITH SHIPPING ADDRESSES

CROSS-REFERENCE TO RELATED APPLICATION

This application claims priority of patent application Ser. No. 0499/95-4, filed in Switzerland on Feb. 21, 1995, the subject matter of which is incorporated herein by reference.

BACKGROUND OF THE INVENTION

The invention relates to an apparatus for processing shipping articles, for example, letters and shipping pouches which are provided with shipping addresses, and more particularly to an such an apparatus that includes a device for transporting the shipping articles along a transport path, a device for automatically reading the shipping addresses and a device for automatically assessing the read shipping addresses, as well as a corresponding method of using the apparatus.

Apparatuses of this type are used in, for example, post offices in connection with sorting letters according to destination and delivery area. In this instance, the shipping addresses of the individual letters are automatically read with a camera. The destinations and delivery areas for the letters are determined in the assessment device based on the read shipping addresses. On the basis of this assessment, the letters can be automatically transported to collection containers for the individual destinations and delivery areas and deposited into them.

In the operation of apparatuses of this type, the assessment of the automatically read shipping addresses can be rather time-consuming. Consequently, the sequence of operation is generally delayed unnecessarily because the number of letters that can be processed per unit of time is determined by the letter whose shipping address requires the most time for assessment. On the other hand, individual letters can be misrouted during operation of the known apparatuses because no allocation of the letters is possible until the result of assessment has been obtained.

SUMMARY OF THE INVENTION

In view of the above described problems, it is an object of this invention to provide an apparatus and a method of the type mentioned at the outset which can simultaneously assure high operating reliability and high operating performance.

The above and other objects are accomplished according to the invention by the provision of an apparatus for processing shipping articles provided with shipping addresses, comprising: a transport device for transporting the shipping articles, respectively, along a transport path; a reading device disposed in the transport path for automatically reading the shipping addresses; an assessment device coupled to the reading device for automatically assessing the read shipping addresses; an intermediate storage device disposed downstream of the reading device in the transport path and having a plurality of cells into which shipping articles, respectively, can be selectively deposited from the transport path and out of which a respective one of the shipping articles can be selectively guided back into the transport path in response to a first removal signal; and detection means coupled to the intermediate storage device and the assessment device for detecting an association between each cell and the shipping article deposited therein and for producing the first removal signal for removing the shipping article from the cell.

The arrangement according to the invention of the intermediate storage device that has the cells permits the removal and further transport of the shipping articles on the transport path independently of the sequence of deposit of the shipping articles into the cells. Control of the removal and conveyance as a function of the assessment of the shipping addresses allows an adaptation of the time available for assessing the relevant shipping address of each shipping article to the assessment time required by the assessment device, regardless of the handling of other shipping articles.

This means that, with the apparatus of the invention, shipping articles whose shipping addresses can be assessed quickly can be further transported after a brief holding period in the intermediate storage device, while a longer holding period in the intermediate storage device is allowed for shipping articles whose shipping addresses require a longer assessment time. As a result, an increase in operating performance can be attained with the apparatus of the invention, because the arrangement and control of the intermediate storage device in accordance with the invention permits a processing sequence in which the slowest element, that is, the most problematic shipping address, no longer predetermines the operating speed, i.e. the number of shipping articles that can be processed per unit of time.

To assure further transport of the shipping articles which can be removed from the cells as a function of the assessment of the shipping addresses, the association between the cells and the shipping articles deposited therein is detected with the detection means. The unambiguous allocation of the shipping articles to the unambiguously identifiable cells takes place prior to completion of the assessment of the relevant shipping addresses. Consequently, high operating reliability of the apparatus of the invention can be assured, because the state in which no unambiguous allocation is possible for the individual shipping articles has already ended with the deposit of the articles into the cells of the intermediate storage device.

As explained above, the apparatus of the invention permits the execution of a method of processing shipping articles provided with shipping addresses, in which the shipping articles are transported along a transport path and, in the process, the shipping addresses are automatically read and assessed. The arrangement according to the invention of the intermediate storage device allows the speed and reliability of such methods to be increased in that, after the shipping address of the shipping articles has been read, the shipping articles are selectively deposited into the cells of the intermediate storage device disposed in the transport path, and selectively removed from the cells as a function of the assessment of the shipping addresses and conveyed back to the transport path.

In the operation of the apparatus of the invention, it is inevitable that the shipping address of one or a plurality of the shipping articles cannot be assessed. This can be the case, for example, with handwritten letter addresses. Shipping articles of this type must be removed from the normal, fully automatic processing and supplied to manual processing or, if the possibility exists that the relevant shipping addresses cannot be read properly with the automatic reading device, the shipping articles must be sent back to the reading device. To this end the shipping articles can be purposefully removed from the intermediate storage in response to a second removal signal for diversion from the transport path. The second removal signal is produced, according to a further feature of the invention, by the detection device if the read shipping addresses of the relevant shipping articles cannot be automatically assessed.

The shipping articles diverted from the transport path can then be processed by hand or conveyed back to the apparatus of the invention. Moreover, it is also conceivable for the processing of the diverted shipping articles to be determined by appropriate personnel, and for the shipping articles to be conveyed back to the apparatus, for example at a location disposed downstream of the intermediate storage in the transport path, after manual entry of corresponding assessment information.

As an alternative, however, it is also possible to display the addresses which cannot be assessed automatically on screens and have them assessed by appropriate personnel. The information required for further processing can then be entered manually. The first removal signal for the relevant cell can be produced after entry of this information.

A further increase in the operating reliability of the apparatus according to the invention has attained if the detection device can be operated to control the deposit of the shipping articles into the cells. This can prevent double occupancy of the cells.

In order to remove the shipping articles deposited in the cells, each storage cell can have a wall region that can be shifted between a storage position and a removal position for the shipping articles. Consequently, an unintentional removal of the shipping articles can be prevented, and the operating reliability of the apparatus can be increased.

A particularly simple design of the apparatus according to the invention is attained when a driving device is provided with which each cell can be set in a predetermined position relative to the transport path. This permits the deposit of the shipping articles into the cells with a stationary transfer device in that the individual cells are moved into a transfer position that remains unchanged and is established by the predetermined relative position.

In operation of this type of apparatus, it is conceivable to emit the first removal signals for the cells when it is determined that the shipping addresses of the shipping articles deposited therein can essentially be assessed automatically. Particularly reliable operation is achieved if release signals for the shipping articles deposited in the intermediate storage can be produced with the assessment device when an assessment result for the shipping address of the relevant shipping article is present, and the first removal signal can be produced in response to the release signal in order to convey the relevant shipping article back into the transport path.

The cells are advisably driven to rotate endlessly, so that merely one simple driving motor, operable in one driving direction, is necessary.

A particularly compact design results if the endless rotation of the cells follows a circular path that has an axis of rotation.

If the individual cells are limited by cell walls disposed in axial planes extending radially of the axis of rotation, the deposit of the shipping articles can be effected by a simple movement in a radial direction with respect to the axis of rotation.

An apparatus of this type can be designed to be particularly compact and structurally simple if a cell wall serves to limit two adjacent cells, i.e., is a common wall between two cells.

An increase in operating reliability of such apparatuses is achieved if the cell walls are configured to be essentially rectangular with a side edge which extends parallel to the axis of rotation, because the transfer position for the individual cells remains the same over the entire axial expansion of the cells, and operational disturbances caused by axial changes in the position or size of the shipping articles to be deposited in the transfer position can be precluded.

The shipping articles can be prevented from becoming jammed or wedged between the end regions of a cell facing the axis of rotation if the shipping articles can be made to extend from a jacket surface of a circular cylinder whose diameter is predetermined by the maximum allowed thickness of the shipping articles and whose cylinder axis coincides with the axis of rotation.

The apparatus of the invention having cell walls disposed in axial planes that extend radially of the axis of rotation can be embodied in a structurally simple manner if the dimensions of the individual cells are identical. To this end the intermediate storage device is preferably constructed such that all angles formed between adjacent cell walls are identical.

A particularly simple removal of the shipping articles from the individual cells of the intermediate storage device making use of gravity is permitted if the axis of rotation extends essentially vertically, i.e., in the direction of gravity, and the displaceable wall region of the cells is respectively disposed on the cell floor.

As already mentioned, the above-described problems associated with apparatuses of the type that can be solved with this invention can be primarily attributed to the fact that the assessment of the shipping addresses is very time-consuming. To use the assessment information that has been obtained with a considerable expenditure of time in further processing of the shipping articles, it is particularly advantageous if, after their shipping address has been read, the shipping articles can be conveyed to a device for applying a code to the article, for example a barcode, which represents the result of assessment. Such a device for applying the code would be disposed downstream of the reading device in the transport path.

The shipping articles are advisably supplied from the intermediate storage device to the device for applying the coding in response to the removal signal.

These and other features and advantages of the invention will be further understood from the following detailed description of the preferred embodiments with reference to the accompanying drawing.

DETAILED DESCRIPTION OF THE PREFERRED EMBODIMENTS

Figures 1, 3:
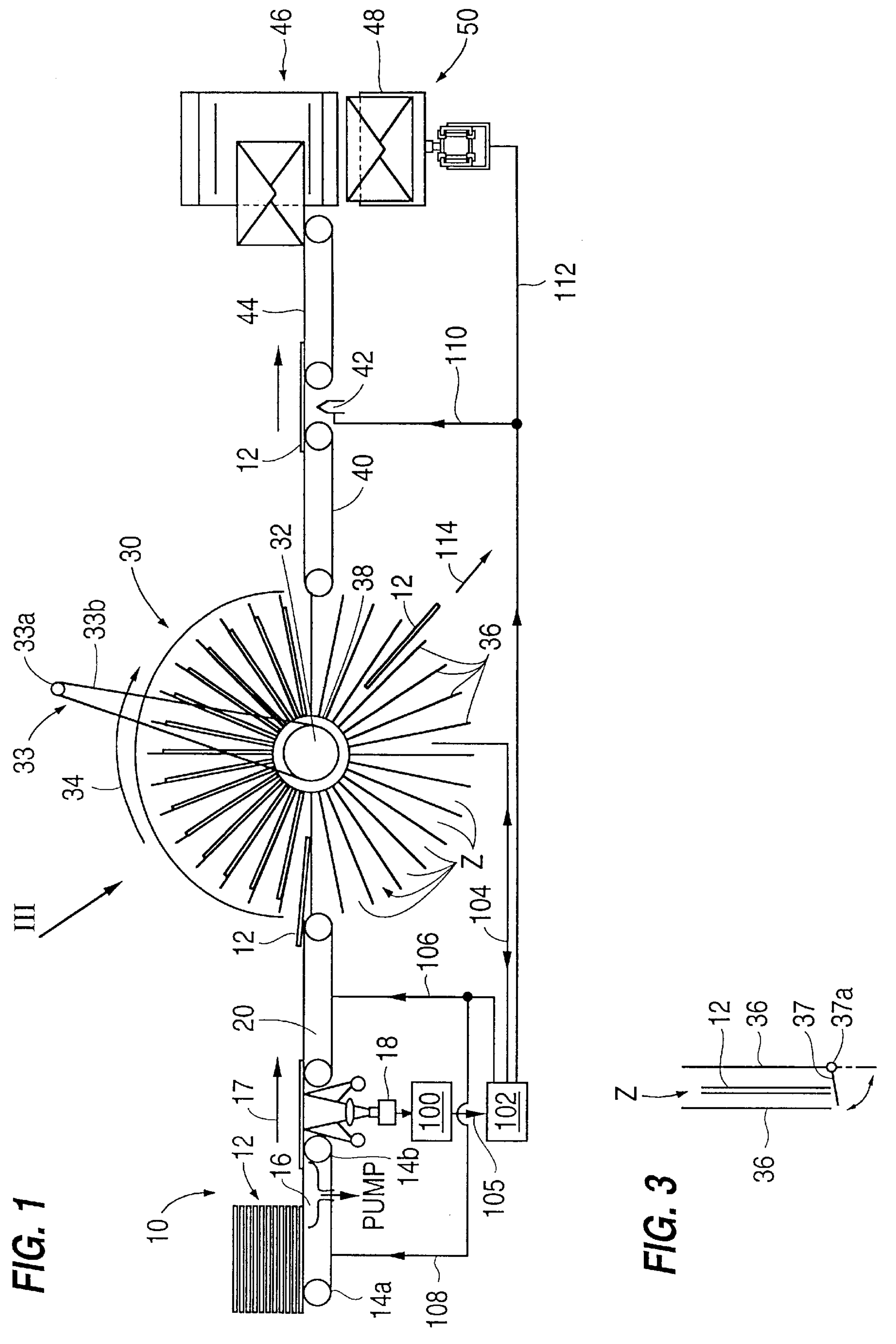
FIG. 1 schematically shows a plan view of an apparatus according to one embodiment of the invention.
FIG. 3 schematically shows an end view of one of the cells Z depicted in FIGS. 1 and 3.

Referring to FIG. 1, there is shown a feeder 10 containing an upright stack of letters 12 from which individual letters are drawn and guided into a transport path. Each letter 12 is first transferred in the direction of the arrow 17 into a detection region of a camera 18 so that the shipping address can be read. A suction device 16 disposed at an endlessly circulating conveyor belt 14 and connected to a pump, not shown, generates a vacuum that is used to draw off individual letters 12. As can be seen from the drawing, endlessly circulating conveyor belt 14 is guided around two rollers 14*a* and 14*b* which are essentially oriented vertically, causing the drawn-off letters 12 to maintain their orientation when they are transferred into the detection region of camera 18.

After the letters leave the detection region of camera 18, they are transferred along their further transport path into a transfer position for individual cells Z of an intermediate storage device configured as a storage wheel 30 by a transfer device configured as an endlessly circulating conveyor belt 20, and are deposited into respective ones of the cells Z. Storage wheel 30 rotates about an axis of rotation 32 that extends vertically in the direction of gravity. For this purpose, a drive device 33 in the form of a drive motor 33*a* is coupled to the axis of rotation via a drive belt 33*b*. Individual cells Z are limited by cell walls 36 lying in axial planes that extend radially of axis of rotation 32. Each of the cell walls 36 serves to limit two adjacent cells Z simultaneously. As can further be seen from the drawing, storage wheel 30 has a uniform construction in which all angles formed between adjacent cell walls 36 are identical. It can also be seen that cell walls 36 extend from a jacket surface 38 of a circular cylinder which has a predetermined diameter and whose cylinder axis coincides with the axis of rotation 32. This ensures that a minimum spacing will be retained between the radially inside end regions of adjacent cell walls 36, the spacing being larger than the maximum thickness of the letters 12 to be processed, which can prevent the letters 12 deposited in cells Z from being jammed or wedged between the radially inside end regions of cell walls 36.

Letters 12 deposited individually into cells Z are carried along with storage wheel 30, which rotates in the direction indicated by arrow 34. Letters 12 are deposited onto an endlessly circulating conveyor belt 40, which continues the transport path, by opening of removal flaps 37 respectively disposed at the bottom of the individual cells and articulated to one of the side walls 36 of a cell Z as shown in FIG. 3 for pivoting about a pivot axis 37*a*.

For simplification of the illustration, endlessly circulating conveyor belt 40 is shown with lateral offset with respect to storage wheel 30. In actuality, conveyor belt 40 is disposed beneath storage wheel 30 such that letters 12 ejected from the cells of the wheel land on conveyor belt 40 in the correct position. Letters 12 are conveyed by conveyor belt 40 into a printing region of an ink jet printer 42. There a barcode representing the result of an assessment of the shipping addresses of the letters performed in an assessment device 100 coupled to camera 18 can be applied to the letter by printer 42 downstream of camera 18.

Letters 12 are subsequently taken from a further endlessly circulating conveyor belt 44 of the transport path and transferred to a vertical conveyor 46. Letters 12 are placed individually into pockets 48 of an endlessly rotating transporter 50 by the vertical conveyor 46, with one letter being placed into each pocket 48. The letters 12 deposited in pockets 48 are transported to collection containers (not shown) arranged according to delivery area, and deposited into one of the collection containers as a function of the result of the assessment of the shipping address read with camera 18.

Image signals representing the shipping addresses read by camera 18 are sent to assessment device 100 during operation of the above-described apparatus. In assessment device 100, the relevant letter is assigned to a specific delivery area or destination based on the read shipping address. A certain amount of time, depending on the legibility of the shipping address, is required for this assessment.

During this time, the letters 12 are held respectively in cells Z of storage wheel 30. By way of a signal path 104, the association between the individual cells Z and the letters 12 deposited therein is detected by a detection device 102 based on the respective rotational position of storage wheel 30. Moreover, detection device 102 controls conveyor belts 14 and 20 by way of signal paths 106 and 108, preventing double occupancy of cells Z.

Upon completion of the assessment of the shipping address of one of letters 12 deposited in a cell Z of storage wheel 30, a release signal for the relevant letter is sent to detection device 102 by assessment device 100 by way of a signal path 105. After the release signal has been sent, a first removal signal for the relevant storage cell Z is produced by detection device 102 and sent to storage wheel 30 by way of signal path 104 as soon as the relevant cell Z is located above conveyor belt 40. In response to the first removal signal, removal flap 37 located at the bottom of the relevant cell Z is opened and letter 12 lying therein is deposited onto conveyor belt 40. For this purpose, removal flap 37 is pivoted around pivot axis 37*a* into a release position in a vertical plane as shown by the broken line in FIG. 3.

In addition to the release signal, another signal which represents the result of the assessment of the relevant letter address is sent by assessment device 100 to detection device 102 by way of signal path 105. In dependence on the time of emission of the release signal for the relevant letter, a control signal representing the assessment result is sent to ink jet printer 42 and transporter 50 by way of signal paths 110 and 112. The control signal permits the printing of the relevant letter 12 with a barcode representing the assessment result, and the transport of letter 12 to the collection container predetermined by the shipping address.

In the case that assessment device 100 detects that automatic assessment of one of the read shipping addresses is not possible, a signal representing this result is sent to detection device 102 by way of signal path 105 for the relevant letter. In response to this latter signal, detection device 102 produces a second removal signal for the relevant cell Z as soon as the cell is located above a collection point for letters 12 whose addresses cannot be assessed automatically. In response to the second removal signal, the removal flap disposed at the bottom of the relevant cell is opened, and the relevant letter 12 is conveyed to the collection point, as indicated by arrow 114. The letters collected at the collection point can either be conveyed back to the automatic apparatus or to manual processing. After these letters have been allocated to the corresponding delivery areas by the appropriate personnel and corresponding information has been entered into detection device 102, the letters can be conveyed to conveyor belt 40 and incorporated back into the automatic processing operation.

Operation of the apparatus described above and illustrated in the drawing permits letters whose addresses allow for rapid assessment to be deposited onto conveyor belt 40 and conveyed to transporter 50 after only a half-revolution of storage wheel 30. On the other hand, letters whose addresses require more time for assessment can be held in one of cells Z for a plurality of revolutions of storage wheel 30 without influencing the deposit and further transport of letters whose addresses can be assessed quickly. Overall this can increase the number of letters processed per unit of time, because letters whose shipping addresses are difficult to assess do not unnecessarily delay the sequence of operation. Furthermore, the illustrated configuration of the intermediate storage as a storage wheel 30 having compartment-type cells Z is extremely compact, so that the described acceleration of processing operations can be achieved with an apparatus that requires only a small amount of space. This space requirement is further decreased with the apparatus illustrated in the drawing because conveyor belts 20, 40 and 44 are configured as conveyor walls against which the letters merely lean during transport.

Figure 2:
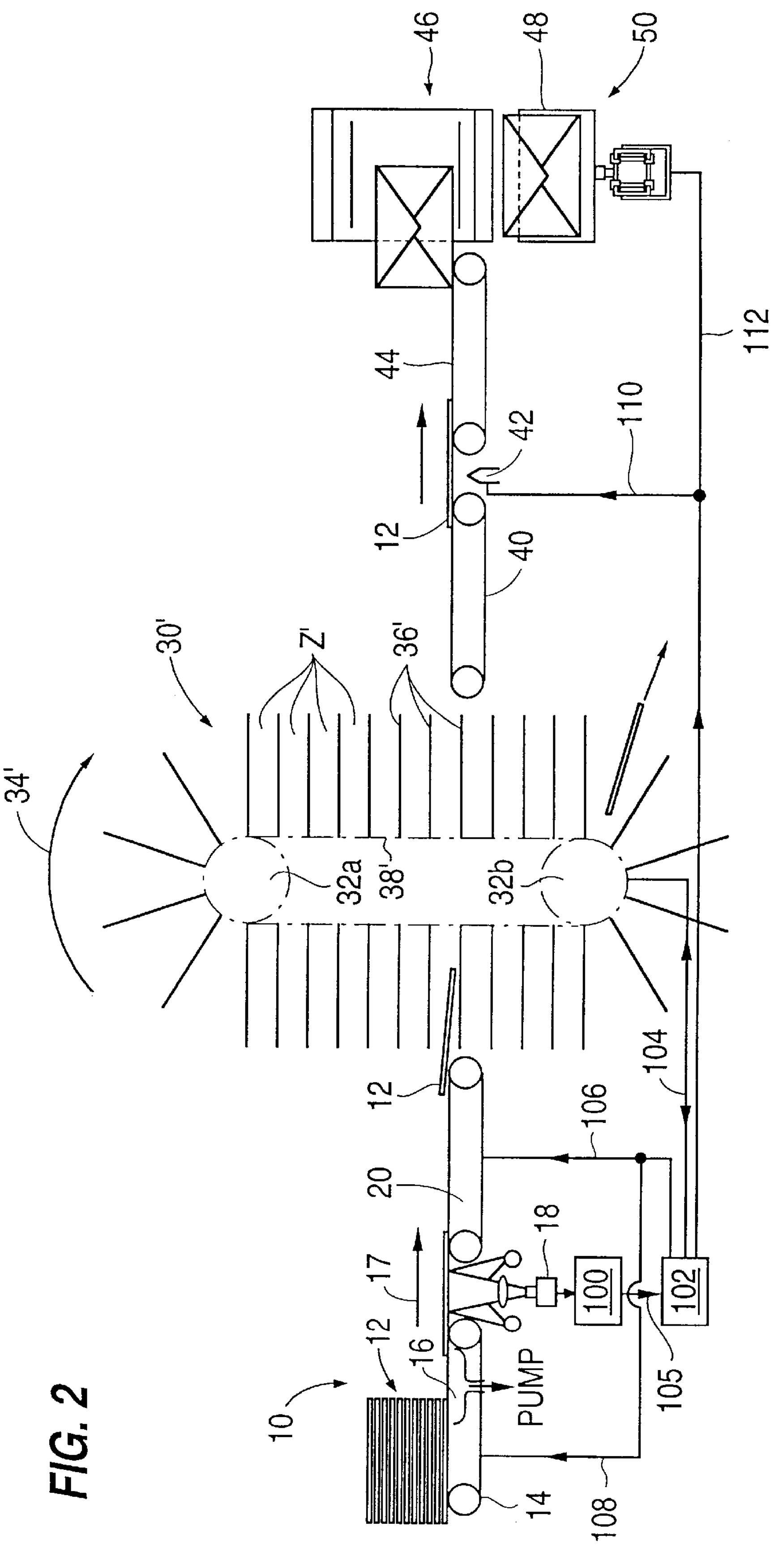
FIG. 2 schematically shows a plan view of an apparatus according to another embodiment of the invention.

FIG. 2 illustrates another embodiment of the invention where like reference numerals identify like components. The only difference from the embodiment of FIG. 1 is that in FIG. 2 the intermediate storage device is configured as a conveying device 33' that circulates endlessly around two axes 32*a*, 32*b*. Cells Z' in FIG. 2 are formed by adjacent cell walls 36' which extend from a jacket 38' that is driven about axes 32*a*, 33*b* in the direction of arrow 34'. The embodiment of FIG. 2 operates in a similar manner as that described in connection with FIG. 1.

It will be understood that the above description of the present invention is susceptible to various modifications, changes and adaptations, and the same are intended to be comprehended within the meaning and range of equivalents of the appended claims.

What is claimed is:

1. An apparatus for processing shipping articles provided with shipping addresses, comprising:

- a transport device for transporting the shipping articles, respectively, along a transport path;
- a reading device disposed in the transport path for automatically reading the shipping addresses;
- an assessment device coupled to the reading device for automatically assessing the read shipping addresses;
- an intermediate storage device disposed downstream of the reading device in the transport path and having a plurality of cells which are displaceable relative to the transport path so that the shipping articles, respectively, can be deposited from the transport path into a respective one of the cells in a first area of the transport path and can be selectively guided back from the respective cells into a second area of the transport path in response to a first removal signal; and
- detection means coupled to the intermediate storage device and the assessment device for detecting an association between each cell and the shipping article deposited therein and for producing the first removal signal for removing the shipping articles from the respective cells as a function the assessment of a read shipping address of a respective one of the shipping articles.

2. An apparatus as defined in claim 1, wherein said detection means additionally produces a second removal signal if automatic assessment of the read shipping address of a shipping article cannot be performed, the second removal signal being received by the intermediate storage device for causing the shipping article to be removed from its cell and diverted from the transport path.

3. An apparatus as defined in claim 1, wherein the detection means is coupled to the transport device and to the intermediate storage device for controlling the deposit of the shipping articles into the cells.

4. An apparatus as defined in claim 1, wherein each cell has a wall region which can be shifted between a first position for storing a shipping article and a second position for removing the shipping article from the cell.

5. An apparatus as defined in claim 1, further comprising a drive means for driving the intermediate storage device for setting each cell in a predetermined position relative to the transport path.

6. An apparatus as defined in claim 5, wherein the assessment device produces a release signal for a shipping article deposited in the intermediate storage device if an assessment result is achieved for the shipping address of the shipping article, and the detection means is responsive to the release signal for producing the first removal signal.

7. An apparatus as defined in claim 5, wherein the intermediate storage device is rotatable in one direction and the cells are arranged in the intermediate storage device to rotate endlessly upon rotation of the intermediate storage device in the one direction.

8. An apparatus as defined in claim 7, wherein the endless rotation of the cells follows a circular path having an axis of rotation.

9. An apparatus as defined in claim 8, wherein the cells are limited by cell walls disposed in axial planes extending radially from the axis of rotation.

10. An apparatus as defined in claim 9, wherein at least one of the cell walls is a common wall between two cells.

11. An apparatus as defined in claim 9, wherein the cell walls are configured to be essentially rectangular and each cell wall has an edge extending parallel to the axis of rotation.

12. An apparatus as defined in claim 9, wherein the intermediate storage device includes a circular cylinder having an axis that coincides with said axis of rotation, the circular cylinder presenting a jacket surface and the cell walls extend from the jacket surface which has a diameter predetermined by a maximum thickness permitted for processing the shipping articles.

13. An apparatus as defined in claim 8, wherein the axis of rotation extends essentially in the direction of gravity, and the cells each have a displaceable wall region disposed at the bottom of the respective cells.

14. An apparatus as defined in claim 1, wherein the cells have identical dimensions.

15. An apparatus as defined in claim 1, and further including code applying means disposed downstream of the intermediate storage device for applying a coding to the shipping articles which represents the result of the assessment.

16. An apparatus as defined in claim 15, further including a conveyor arranged to convey shipping articles removed from the intermediate storage device in response to the first removal signal to the code applying means.

17. A method of automatically processing shipping articles provided with shipping addresses, comprising:

- transporting the shipping articles along a transport path with the use of a transporting device;
- automatically reading the shipping addresses with a reading device;
- automatically assessing the read addresses with an assessment device;
- depositing the individual shipping articles from a first area of the transport path into respective cells of an intermediate storage device disposed in the transport path, wherein the respective cells are displaceable relative to the transport path;
- automatically detecting an association between respective ones of the cells and the shipping articles deposited therein; and
- selectively removing the shipping articles from the cells as a function of the automatic assessment of the read addresses and guiding the removed shipping articles to a second area of the transport path.

18. A method as defined in claim 17, further including producing a release signal indicating the presence of an assessment result for a given shipping article and wherein the removing step includes removing the given shipping article from its cell in response to the release signal.

19. A method as defined in claim 17, including removing a shipping article from the intermediate storage device and diverting the shipping article from the transport path if automatic assessment of the shipping address of the shipping article is not possible.

20. A method as defined in claim 17, wherein the depositing step includes controllably depositing the shipping articles into cells.

21. A method as defined in claim 17, including setting the cells in a predetermined position relative to the transport path for the deposit of consecutive shipping articles into consecutive cells.

22. A method as defined in 17, further including applying a coding to the shipping articles along the transport path following the reading and assessing steps, wherein the coding represents the result of the assessment of the read addresses.

23. A method as defined in claim 22, wherein the applying step includes applying a digital coding to a respective one of the articles after the article is removed from the intermediate storage device in response to the removal signal.

* * * * *